United States Patent
Yeo

(10) Patent No.: US 6,500,091 B2
(45) Date of Patent: Dec. 31, 2002

(54) SHIFT CONTROL METHOD FOR AUTOMATIC TRANSMISSION

(75) Inventor: Chang-Gi Yeo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 41 days.

(21) Appl. No.: 09/749,942

(22) Filed: Dec. 29, 2000

(65) Prior Publication Data

US 2001/0056007 A1 Dec. 27, 2001

(30) Foreign Application Priority Data

Jun. 26, 2000 (KR) ........................................ 2000-35301

(51) Int. Cl.$^7$ ............................................... F16H 59/66
(52) U.S. Cl. ........................ 477/97; 477/900; 477/901; 701/56; 701/65
(58) Field of Search .......................... 477/97, 900, 901; 701/56, 55, 65, 66

(56) References Cited

U.S. PATENT DOCUMENTS

| | | | | |
|---|---|---|---|---|
| 4,713,764 A | * | 12/1987 | Klatt ............................ | 701/65 |
| 5,010,490 A | * | 4/1991 | Naito et al. .................... | 701/95 |
| 5,035,160 A | * | 7/1991 | Morita .................... | 477/900 X |
| 5,051,905 A | * | 9/1991 | Yoshida ..................... | 701/55 X |
| 5,765,117 A | * | 6/1998 | Horiguchi ..................... | 701/51 |
| 5,832,400 A | * | 11/1998 | Takahashi et al. ......... | 701/65 X |
| 6,249,735 B1 | * | 6/2001 | Yamada et al. ............... | 701/65 |
| 6,275,760 B1 | * | 8/2001 | Saito et al. .................... | 701/55 |

* cited by examiner

Primary Examiner—Richard M. Lorence
Assistant Examiner—Ha Ho
(74) Attorney, Agent, or Firm—Birch, Stewart, Kolasch & Birch, LLP

(57) ABSTRACT

A shift control method for an automatic transmission while a vehicle runs up a slope while towing a trailer includes the steps of determining if present shift lever position indicates a driving range 2, calculating weight-slope resistance if the shift lever position indicates the driving range 2, determining if the weight-slope resistance is greater than a threshold weight-slope resistance, measuring time duration during which the weight-slope resistance is maintained over the threshold value if the weight-slope resistance is greater than the threshold weight-slope resistance, determining if the time duration is longer than a threshold time, converting a present normal shift pattern into a trailer-towing shift pattern if the time duration is longer than a threshold time, and returning the trailer-towing shift pattern to the normal shift pattern if the weight-slope resistance becomes equal to or less than the threshold weight-slope resistance and this condition is maintained over a second threshold time.

4 Claims, 2 Drawing Sheets

SHIFT CONTROL METHOD FOR AUTOMATIC TRANSMISSION

BACKGROUND OF THE INVENTION (a) Field of the Invention

The present invention relates to a shift control method for an automatic transmission of a vehicle especially when the vehicle runs up a slope while towing a trailer.

(b) Description of the Related Art

Recently, the number of vehicles towing trailers with various leisure equipment has tended to increase as leisure activities have diversified. In this case of a vehicle towing a trailer, a large traction force are required.

When the vehicle towing the trailer is a manual transmission equipped vehicle, it is possible for a driver to appropriately perform shift operation while considering the present load condition of the vehicle.

However, in the case of a vehicle equipped with an automatic transmission, the shift operation is automatically performed according to the vehicle's conditions such as running speed, throttle opening level, and so on by a transmission control unit (TCU) controlling various valves of a hydraulic pressure system cooperating with a gear train, such that intentional shift operation by the driver is limited.

Accordingly, it is required to adapt a separate shift control logic for when the vehicle tows a trailer, but this kind of logic has not been adapted to automatic transmission control until now such that the shift operation has been performed in the same shift pattern as a normal state even when towing a trailer.

If the shift control is performed with the normal shift pattern, especially when the vehicle runs up a slope with the trailer, generally second speed range is selected. However, a vehicle running in the second speed range experiences a lack of driving torque and an extreme slippage of the torque converter that causes the oil temperature to heighten.

SUMMARY OF THE INVENTION

The present invention has been made in an effort to solve the above problems.

It is an object of the present invention to provide a shift control method of an automatic transmission for a vehicle especially when the vehicle runs up a slope while towing a trailer so as to obtain enough driving torque, reduce slippage of the torque converter, and prevent the oil temperature from being heightened.

To achieve the above object, the shift control method for an automatic transmission of the present invention comprises the steps of determining if present shift lever position indicates a driving range 2, calculating weight-slope resistance if the shift lever position indicates the driving range 2, determining if the weight-slope resistance is greater than a threshold weight-slope resistance, measuring time duration during which the weight-slope resistance is maintained over the threshold value if the weight-slope resistance is greater than the threshold weight-slope resistance, determining if the time duration is longer than a threshold time, converting a present normal shift pattern into a trailer-towing shift pattern if the time duration is longer than a threshold time, and returning the trailer-towing shift pattern to the normal shift pattern if the weight-slope resistance becomes equal to or less than the threshold weight-slope resistance and this condition is maintained over a second threshold time.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Preferred embodiments of the present invention will be described hereinafter with reference to the accompanying drawings.

Figure 1:
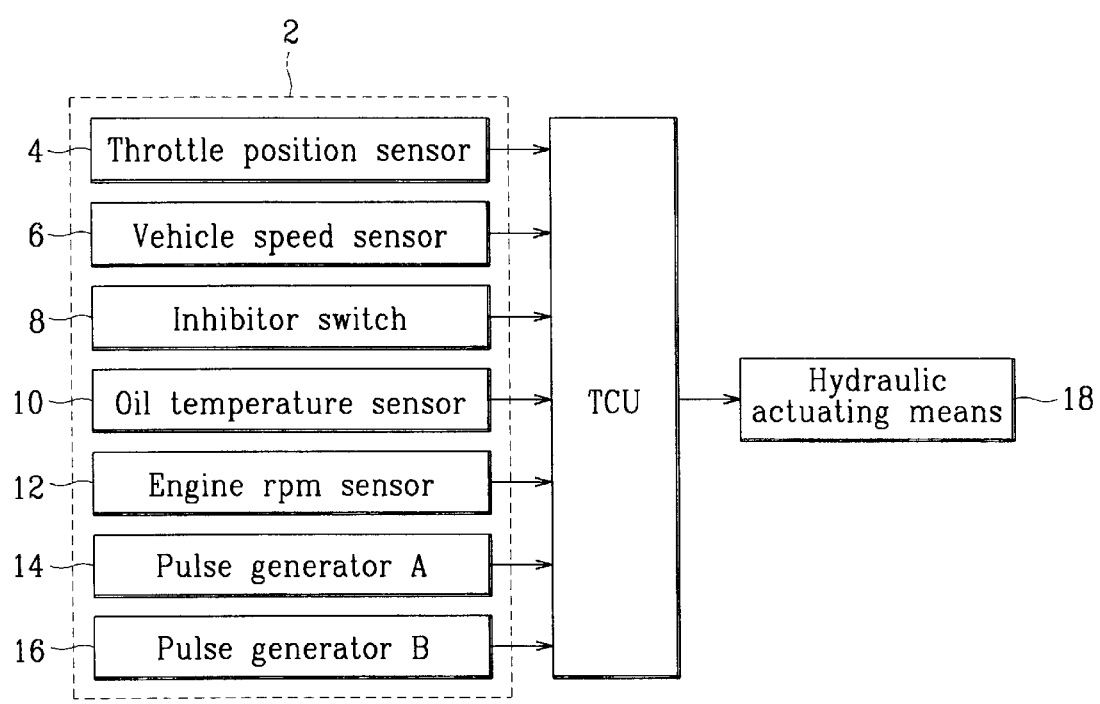
FIG. 1 is a block diagram for illustrating a transmission control system according a preferred embodiment of the present invention.

As shown in FIG. 1, an automatic transmission control system comprises a vehicle condition detection means 2, a transmission control unit (TCU), and a hydraulic control means.

The vehicle condition detection means 2 comprises a throttle position sensor 4 for detecting throttle-opening level, a vehicle speed sensor 6, an inhibitor switch 8 for detecting position of a shift lever, an oil temperature sensor 10, an engine rpm sensor 12, and first and second pulse generators 14 and 16 for respectively detecting kick-down servo rpm and output rpm, each of them electrically connected to a transmission control unit (TCU) such that data from the vehicle condition detection means 2 is compared to predetermined parameters and analyzed by the TCU and then the TCU performs shift control by controlling hydraulic actuating means 18 comprising various solenoid valves.

A shift control method of the above structured transmission control system used particularly when a vehicle equipped with the transmission control system runs up a slope while towing a trailer will be described hereinafter.

Figure 2:
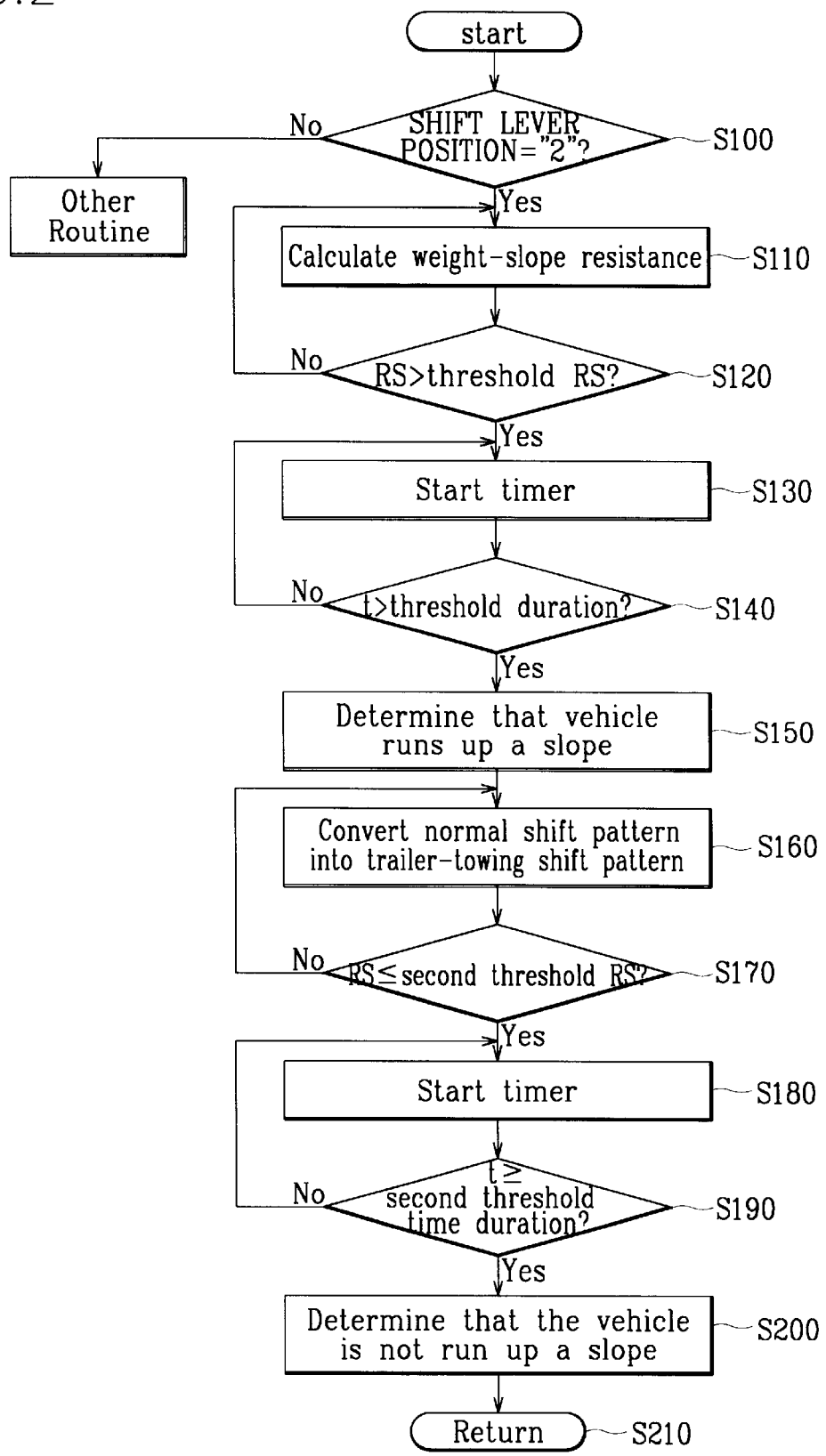
FIG. 2 is a flow chart for illustrating a shift control method for an automatic transmission of a vehicle especially when the vehicle runs up a slope while towing a trailer.

As shown in FIG. 2, during shift operation the TCU determines if the shift lever is positioned at a driving range "2" or not on the basis of the data from the inhibitor switch 8 at step S100.

If the shift lever is positioned at other ranges of P, R, N, D, 4, or 3, the shift operation is performed according to the normal shift pattern, and if the shift lever is positioned at the driving range "2", the TCU calculates a weight-slope resistance at step S110, and then determines if the weight-slope resistance is greater than a reference value at step S120.

If the weight-slope resistance is greater than the reference value, the TCU operates a timer at step S130 and then determines if the duration, while the weight-slope resistance is greater than the reference value, is longer than a reference period of time, for example 16 ms, at step S140.

If the duration is longer than the reference period of time, the TCU determines that the vehicle runs up a slope at step S150 such that the TCU converts the present normal shift pattern to a trailer-towing shift pattern at step S160.

If the condition is not satisfied at step S120, the algorithm process returns to the step S110, and if the condition is not satisfied at step S140, the algorithm process returns to step S130.

The reference weight-slope resistance value is set in consideration of engine performance, gear ratios of the transmission, and so on, because these factors differ with each vehicle. Also, the trailer-towing shift pattern is preset in consideration of trailer towing conditions.

After shift operation in the trailer-towing shift pattern at step S160, the TCU determines again if the weight-slope resistance is equal to or less than the reference weight-slope resistance at step S170. If the weight-slope resistance is equal to or less than the reference weight-slope resistance, the TCU operates the timer at step S180 and then determines if the duration while the weight-slope resistance is greater than the reference value is longer than a reference period time at step S190.

If the duration while the weight-slope resistance is greater than the reference value is longer than a reference time period, the TCU determines that the vehicle is not running up a slope at step S200 and it returns to the initial step.

If the weight-slope resistance condition is not satisfied at step S170, the algorithm process returns to the step S160, and if the condition is not satisfied at step S190, the algorithm returns to the step S180.

At steps S120 and S170, even though the reference weight-slope resistances can be set as the same value, it is preferred to set the reference weight-slope resistance at step S120 so as to be greater than the reference weight-slope resistance at step S170.

The shift control on a slope while towing a trailer according to the present invention is performed in the state when it is determined that the present shift range is at range "2", and the vehicle runs up a slope while towing a trailer, such that if these conditions are not satisfied, the trailer-towing shift control pattern returns to the normal shift control pattern.

Also, the reason for the adaptation of shift range "2" as the condition for the trailer-towing shift control pattern is to prevent unintentional shift behavior from causing a dangerous state.

As described above, in the shift control method of the automatic transmission, a separate shift control logic is used when the vehicle runs up a slope while towing a trailer so as to obtain enough driving torque, reduce slippage of the torque converter, and prevent oil temperature from being heightened.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A shift control method for an automatic transmission while a vehicle runs up a slope while towing a trailer comprising the steps of:

determining if present shift lever position indicates a driving range 2;

calculating weight-slope resistance if the shift lever position indicates the driving range 2;

determining if the weight-slope resistance is greater than a threshold weight-slope resistance;

measuring a time duration during which the weight-slope resistance is maintained over the threshold value when the weight-slope resistance is greater than the threshold weight-slope resistance;

determining if the time duration is longer than a threshold time; and converting a present normal shift pattern into a trailer-towing shift pattern when the time duration is longer than a threshold time.

2. The shift control method of claim 1 wherein when the weight-slope resistance becomes equal to or less than the threshold weight-slope resistance and this condition is maintained over a second threshold time, the trailer-towing shift pattern is returned to the normal shift pattern.

3. A shift control method for an automatic transmission while a vehicle runs up a slope and tows a trailer comprising the steps of:

a) determining if present shift lever position indicates a driving range 2;

b) calculating weight-slope resistance when the present shift lever position indicates the driving range 2;

c) determining if the weight-slope resistance is greater than a threshold weight-slope resistance;

d) starting a timer when the weight-slope resistance is greater than the threshold weight-slope resistance;

e) measuring a time duration during which the weight-slope resistance is greater than the threshold weight-slope resistance;

f) determining if the time duration is longer than a threshold time duration;

g) determining that the vehicle runs up a slope when the time duration is longer than the threshold time duration; and h) converting a present normal shift pattern into a trailer-towing shift pattern.

4. The shift control method of claim 3 further comprising the steps of:

i) determining if the weight-slope resistance is equal to or less than a second threshold weight-slope resistance;

j) starting the timer if the weight-slope resistance is equal to or less than the second threshold weight-slope resistance;

k) measuring time duration during which the weight-slope resistance is equal to or less than the second threshold weight-slope resistance;

l) determining if the time duration is longer than a second threshold time duration;

m) determining that the vehicle is not running up a slope when the time duration is longer than a second threshold time duration; and n) returning the trailer-towing shift pattern to the normal shift pattern.

* * * * *